United States Patent
Laughlin et al.

(10) Patent No.: US 9,262,641 B1
(45) Date of Patent: Feb. 16, 2016

(54) SYSTEM AND METHODS OF PROVIDING DATA TO A MOBILE COMPUTING DEVICE

(71) Applicant: The Boeing Company, Seal Beach, CA (US)

(72) Inventors: Brian Dale Laughlin, Wichita, KS (US); William David Kelsey, Issaquah, WA (US); Richard N. Blair, Kent, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 14/013,504

(22) Filed: Aug. 29, 2013

(51) Int. Cl.
*G06F 21/00* (2013.01)
*G06F 21/62* (2013.01)
*H04M 1/66* (2006.01)
*H04L 29/06* (2006.01)

(52) U.S. Cl.
CPC ............... *G06F 21/62* (2013.01); *G06F 21/00* (2013.01); *H04L 63/08* (2013.01); *H04M 1/66* (2013.01)

(58) Field of Classification Search
USPC ............. 726/29; 705/26, 35, 14, 39; 455/405, 455/406
See application file for complete search history.

(56) References Cited

U.S. PATENT DOCUMENTS

| | | | |
|---|---|---|---|
| 6,941,471 B2 | 9/2005 | Lin | |
| 8,302,030 B2 | 10/2012 | Soroca et al. | |
| 8,311,513 B1 | 11/2012 | Nasserbakht et al. | |
| 8,364,540 B2 | 1/2013 | Soroca et al. | |
| 2010/0094878 A1* | 4/2010 | Soroca et al. | 707/748 |
| 2014/0222864 A1* | 8/2014 | Runge et al. | 707/770 |

FOREIGN PATENT DOCUMENTS

| | | |
|---|---|---|
| EP | 1603638 A1 | 3/2006 |
| EP | 1650690 A1 | 4/2006 |
| EP | 1630638 B1 | 9/2007 |

* cited by examiner

*Primary Examiner* — Jeffrey Pwu
*Assistant Examiner* — Samuel Ambaye
(74) *Attorney, Agent, or Firm* — Armstrong & Teasdale LLP

(57) ABSTRACT

A system for authorizing data to be provided to a mobile computing device is provided. The system includes the mobile computing device and a server computer that includes a processor and a memory coupled to the processor, the memory including processor-executable instructions for performing the steps of storing, in the memory, parameters for authorizing data to be provided to the mobile computing device and determining at least one contextual cue associated with at least one of a task to be performed, the mobile computing device, and a user of the mobile computing device, wherein the at least one contextual cue is associated with the parameters. The processor-executable instructions also perform the steps of authorizing data to be provided to the mobile computing device when the at least one contextual cue aligns with the parameters and providing the data to the mobile computing device.

17 Claims, 2 Drawing Sheets

SYSTEM AND METHODS OF PROVIDING DATA TO A MOBILE COMPUTING DEVICE

BACKGROUND

The field of the present disclosure relates generally to mobile computing devices and, more specifically, to a system that improves data security and/or that ensures proper usage of data on a mobile computing device.

Mobile computing devices, such as smartphones, cellular phones, tablets, and personal digital assistants (PDAs) have grown in use and popularity among a variety of different types of users. At least some known mobile computing devices use authentication and/or authorization techniques to verify an identity of a user before granting access to the mobile computing device by the user. Exemplary authentication and/or authorization techniques include passwords, personal identification numbers (PINs), smart cards, biometrics, and/or pattern unlock.

While known techniques may limit access to mobile computing devices by unauthorized users, authorized users may have unrestricted access to data stored on and/or transmitted to a mobile computing device. Further, known authentication and/or authorization techniques may be bypassed by unauthorized users such that data on the mobile computing device is accessible by the unauthorized users. Because of this, it has become increasingly important to increase the security of known computing devices. As such, it may be desirable to incorporate enhanced security into mobile computing devices.

BRIEF DESCRIPTION

In one aspect, a system for authorizing data to be provided to a mobile computing device is provided. The system includes the mobile computing device and a server computer that includes a processor and a memory coupled to the processor, the memory including processor-executable instructions for performing the steps of storing, in the memory, parameters for authorizing data to be provided to the mobile computing device and determining at least one contextual cue associated with at least one of a task to be performed, the mobile computing device, and a user of the mobile computing device, wherein the at least one contextual cue is associated with the parameters. The processor-executable instructions also perform the steps of authorizing data to be provided to the mobile computing device when the at least one contextual cue aligns with the parameters and providing the data to the mobile computing device.

In another aspect, a method of authorizing data to be provided to a mobile computing device is provided. The method includes, defining parameters for authorizing data to be provided to the mobile computing device and determining at least one contextual cue associated with at least one of a task to be performed, the mobile computing device, and a user of the mobile computing device, wherein the at least one contextual cue is associated with the parameters. The method also includes authorizing data to be provided to the mobile computing device when the at least one contextual cue aligns with the parameters and providing the data to the mobile computing device.

In yet another aspect, a method of managing an operation using a mobile computing device is provided. The method includes determining at least one task to perform, determining at least one contextual cue associated with at least one of the at least one task, the mobile computing device, and a user of the mobile computing device, selecting data based on the at least one contextual cue, wherein the data is associated with the at least one task, and providing the data to the mobile computing device.

DETAILED DESCRIPTION

The implementations described herein relate to systems and methods that may be used to authorize and/or to select data to be provided to a mobile computing device. More specifically, the systems and methods described herein use a variety of contextual cues associated with a task to be performed, the mobile computing device, and/or a user of the mobile computing device to determine whether data is authorized to be provided to the mobile computing device, or to select which data to provide to the mobile computing device. Further, the contextual cues may be tracked in real-time to facilitate managing an operation to be performed using the mobile computing device. Combining additional security features with traditional authentication and/or authorization techniques facilitates protecting data provided to and/or stored on a mobile computing device from unauthorized access. More specifically, proprietary information (e.g., schematics and diagrams) may be protected from unauthorized access using the systems and methods described herein.

Figure 1:
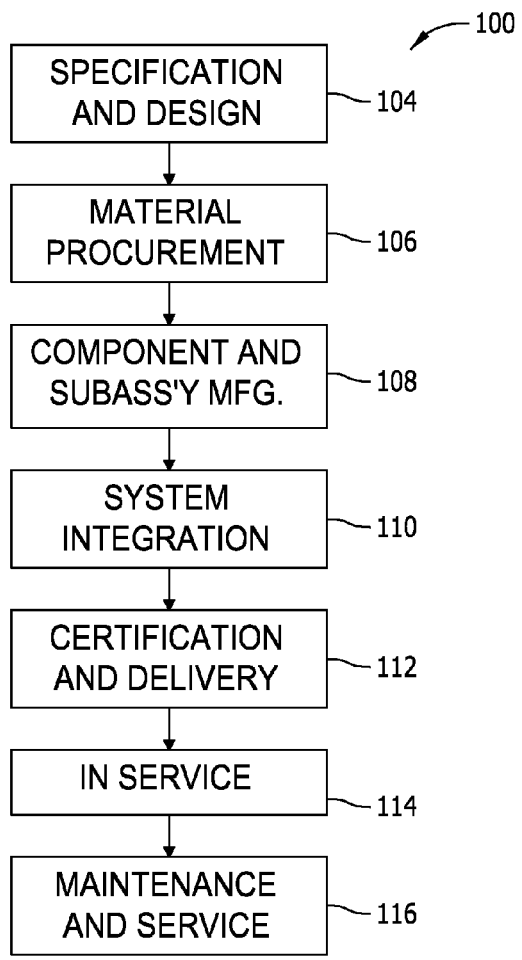
FIG. 1 is a flow diagram of an exemplary aircraft production and service methodology.
Figure 2:
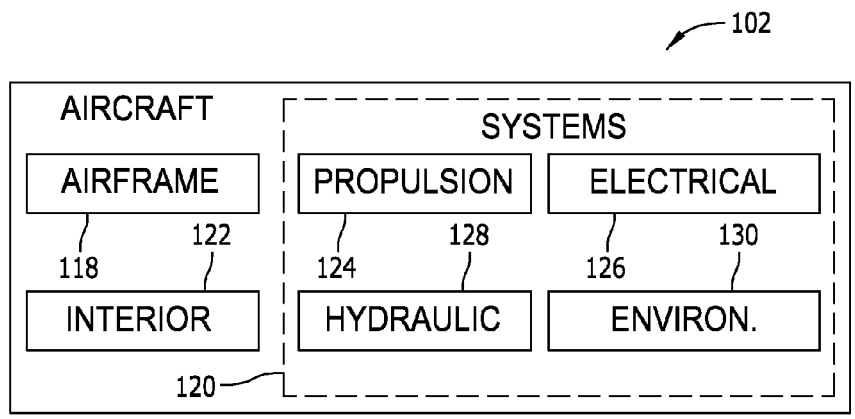
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
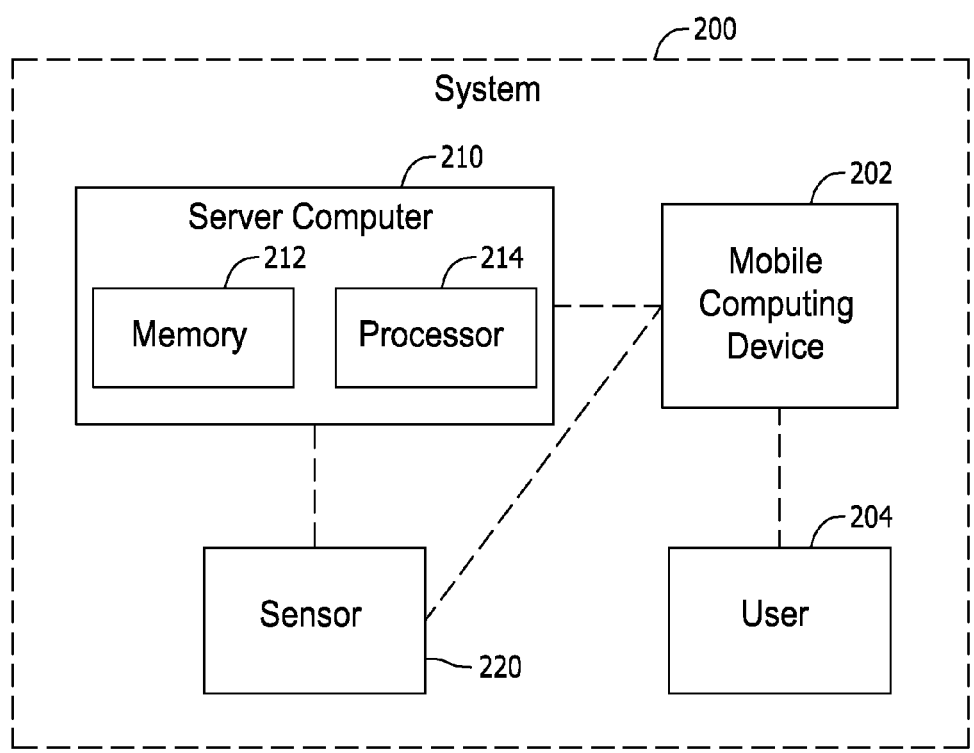
FIG. 3 is schematic diagram of an exemplary system for use in providing data to a mobile computing device.

FIG. 3 is a schematic diagram of an exemplary system 200 that may be used to provide data to a mobile computing device 202. In the exemplary implementation, system 200 includes mobile computing device 202, a user 204 associated with mobile computing device 202, a server computer 210, and a sensor 220. Mobile computing device 202 is communicatively coupled to server computer 210 and sensor 220, and sensor 220 is communicatively coupled to server computer 210.

Server computer 210 includes a memory 212 and a processor 214 coupled to memory 212 for executing programmed instructions. Processor 214 may include one or more processing units (e.g., in a multi-core configuration) and/or include a cryptographic accelerator (not shown). Server computer 210 is programmable to perform one or more operations described herein by programming memory 212 and/or processor 214. For example, processor 214 may be programmed by encoding an operation as executable instructions and providing the executable instructions in memory 212.

Processor 214 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 214, cause processor 214 to perform at least a portion of the functions described herein. The above examples are exemplary only, and thus are not intended to limit in any way the definition and/or meaning of the term processor.

Memory 212 is one or more devices that enable information such as executable instructions and/or other data to be stored and retrieved. Memory 212 may include one or more computer-readable media, such as, without limitation, dynamic random access memory (DRAM), synchronous dynamic random access memory (SDRAM), static random access memory (SRAM), a solid state disk, and/or a hard disk. Memory 212 may be configured to store, without limitation, executable instructions, operating systems, applications, resources, installation scripts and/or any other type of data suitable for use with the methods and systems described herein.

Instructions for operating systems and applications are located in a functional form on non-transitory memory 212 for execution by processor 214 to perform one or more of the processes described herein. These instructions in the different implementations may be embodied on different physical or tangible computer-readable media, such as memory 212 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from server computer 210 to permit access and/or execution by processor 214. In an alternative implementation, the computer-readable media is not removable.

Mobile computing device 202 is provided for supporting communication with another device, such as another mobile computing device. Moreover, mobile computing device 202 may include a variety of other functionalities, including network access, SMS messaging, hosting of one or more applications, data processing, encryption, and/or other functions. Mobile computing device 202 may be a smartphone, configured to communicate through one or more cellular networks. In an alternative implementation, mobile computing device 202 may operate over a non-cellular network such as a WiFi and/or satellite network.

Sensor 220 may be any device capable of providing feedback on the condition of an environment and/or an object. Exemplary sensors include, but are not limited to, a tracking device, a thermometer, a barometer, and a chronograph.

In operation, data is provided to mobile computing device 202 when at least one contextual cue associated with at least one of a task to be performed, mobile computing device 202, and user 204 aligns with parameters associated with each contextual cue. More specifically, the authority to provide data is granted when contextual cues and the parameters align, and the authority is denied and/or revoked when the contextual cues and the parameters do not align. The parameters for granting authorization for each contextual cue may be defined and stored within memory 212 of server computer 210. Further, the contextual cues are either determined by sensor 220 or include other predetermined criteria.

Exemplary contextual cues include, but are not limited to, a location of mobile computing device 202, a location of equipment to be used for performing a task, environmental conditions at a work site location, certification and/or authority of user 204 to perform a task, a duration, date, and/or time of day in which data may be provided to mobile computing device 202, and a duration, date, and/or time of day in which the user is authorized to perform a task. As such, the authority to provide data is granted when at least one of these contextual cues align with the defined parameters for each contextual cue.

The parameter associated with the mobile computing device location contextual cue may be a location and/or a specified area around a location. The location of mobile computing device 202 may be determined in real-time via any suitable tracking device such as, but not limited to, global positioning satellite (GPS), Bluetooth, near field communication, and radio-frequency identification (RFID). As such, the authorization to provide data may be granted when mobile computing device 202 is located within a predetermined distance from the location and/or located within the specified area, and the authorization may be denied and/or revoked when mobile computing device 202 is not located within the predetermined distance or the specified area. The specified area may be an area defined by a geo-fence.

The parameter associated with the equipment location contextual cue may be a location and/or a specified area around a location. Equipment may refer to parts and/or tools for performing a task. The location of the equipment may be determined in real-time via any suitable tracking device such as, but not limited to, global positioning satellite (GPS), Bluetooth, near field communication, and radio-frequency identification (RFID). Moreover, the location and/or identity of equipment may be determined using on-site scanning techniques such as barcode scanning and/or serialized part identification. As such, the authorization to provide data may be granted when equipment is located within a predetermined distance from the location and/or located within the specified area, and the authorization may be denied and/or revoked when equipment is not located within the predetermined distance or the specified area. In an alternative implementation, the location and an identity of the equipment may be confirmed using visual recognition software.

The parameter associated with the environmental condition contextual cue may be an acceptable range of environmental conditions in which a task may be performed. In some manufacturing and/or service operations, materials, parts, or tools may only be implemented when certain environmental conditions are present at a work site location. For example, materials such as sealants and adhesives may only be operable within a predetermined range of environmental conditions such as, but not limited to, temperature, humidity, and precipitation. As such, system 200 may determine the type of equipment that may be needed to perform a task, and the authorization to provide data may be granted when the environmental conditions are suitable for implementing the equipment. The authorization may be denied and/or revoked when the environmental conditions are unsuitable for implementing the equipment.

The parameter associated with the certification and/or authority of user 204 contextual cue may be the validity of a professional certification and/or authority granted by a third party to perform a task. At least some technicians that perform manufacturing and/or service operations are required to be certified by a professional organization to perform such operations. Generally, certifications expire at predetermined intervals, and are renewed via continuing education, for example. Moreover, a third party may designate users that are authorized to receive certain data on a mobile computing device. As such, the authorization to provide data may be granted when the certification and/or authority of user 204 is valid, and the authorization may be denied and/or revoked when the certification and/or authority expires.

The parameter associated with the duration, date, and/or time of day contextual cues may include predetermined durations, dates, and/or times in which data may be provided to mobile computing device 202 or in which the user is authorized to perform a task. As such, the authorization to provide data may be granted when a current time and/or date falls within the predetermined durations, dates, and/or times, and the authorization may be denied and/or revoked when the current time and/or date does not fall within the predetermined durations, dates, and/or times.

As described above, mobile computing device 202 may operate over one or more wireless networks such that data can be provided from a remote data source and in real-time. Once the data has been transmitted to mobile computing device 202, the data may be stored in a memory (not shown) of mobile computing device 202. As such, the data may be accessible when mobile computing device 202 is disconnected from the one or more wireless networks. In an alternative implementation, the stored data may have a temporary lifespan such that user 204 does not have unauthorized access to the data if its authorization has been revoked.

Contextual cues may also be used to manage a manufacturing and/or service operation. More specifically, the type of data to be provided to mobile computing device 202 may be selected based on contextual cues associated with at least one of a task to be performed, mobile computing device 202, and user 204. Contextual cues may be associated with more than one parameter. As such, a first set of data may be provided to mobile computing device 202 when the contextual cue aligns with a first parameter, and a second set of data may be provided to mobile computing device 202 when the contextual cue aligns with a second parameter.

For example, regarding the mobile computing device location contextual cue, an associated first parameter may be a first location and/or a first specified area around the first location, and a second parameter may be a second location and/or a second specified area around the second location. A first operation may need to be performed at the first location and a second operation may need to be performed at the second location, and different sets of data may be needed to effectuate each operation. More specifically, in the aircraft manufacturing and/or service operation context, a first aircraft may be located at the first location and a second aircraft of a different make or model from the first aircraft may be located at the second location. This information may be stored in memory 212 and used to determine which set of data (e.g., schematics, instructions, and/or a work assignment) to provide to mobile computing device 202 when located at either the first or second location. As such, the correct data is ensured to be provided to mobile computing device 202 for user 204 to effectuate the operation.

Moreover, other contextual cues may be used to effectuate the operation depending on which data has been provided to mobile computing device 202 and/or depending on the operation to be performed. More specifically, alignment between predetermined contextual cues and associated parameters may be required for the operation to proceed. As such, an alert may be generated and provided to user 204 when a predetermined contextual cue and associated parameter are misaligned and/or when a contextual cue other than the predetermined contextual cue aligns with the associated parameter.

For example, regarding the equipment location contextual cue, certain equipment may be required to perform a task. The equipment may be selected and located within the predetermined distance from a location and/or within the specified area around the location such that the associated parameter is satisfied. However, when equipment other than the selected equipment is located within the predetermined distance from a location and/or within the specified area, an alert may be generated to indicate that equipment other than the selected equipment is about to be used to perform the task. As such, the correct equipment is ensured to be used to effectuate the operation.

The systems and methods described herein facilitate increasing the security of a mobile computing device, and enable an operation to be managed with the mobile computing device. More specifically, the systems described herein use a variety of contextual cues to determine the authority of the mobile computing device to receive data and/or to more easily manage the operation to be performed. As such, using contextual cues ensures that data such as proprietary information is only provided to authorized persons, ensures that the correct data is provided to authorized persons, and ensures that the correct equipment for performing a task is used.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for authorizing data to be provided to a mobile computing device, said system comprising a server computer that comprises a processor and a memory coupled to said processor, said memory including processor-executable instructions for performing the steps of: storing, in said memory, parameters for authorizing data to be provided to the mobile computing device; determining at least one contextual cue associated with at least one of a task to be performed, the mobile computing device, and a user of the mobile computing device, wherein the at least one contextual cue is associated with the parameters; authorizing data to be provided to the mobile computing device when the at least one contextual cue aligns with the parameters; and providing the data to the mobile computing device; wherein said memory further includes process-executable instructions for performing the steps of determining a change in the at least one contextual cue; and one of denying and revoking the authorization when the at least one contextual cue does not align with the parameters.

2. The system in accordance with claim 1, wherein said memory further includes process-executable instructions for performing the step of tracking changes to the at least one contextual cue in real-time.

3. The system in accordance with claim 1, wherein the at least one contextual cue includes one of a location, an environmental condition, a duration, a date, a time of day, and a user certification.

4. The system in accordance with claim 1 further comprising a sensor configured to determine the at least one contextual cue.

5. A method of authorizing data to be provided to a mobile computing device, said method comprising: defining parameters for authorizing data to be provided to the mobile computing device; determining at least one contextual cue associated with at least one of a task to be performed, the mobile computing device, and a user of the mobile computing device, wherein the at least one contextual cue is associated with the parameters; authorizing data to be provided to the mobile computing device when the at least one contextual cue aligns with the parameters; and providing the data to the mobile computing device; determining a change in the at least one contextual cue; and one of denying and revoking the authorization when the at least one contextual cue does not align with the parameters.

6. The method in accordance with claim 5, wherein determining a change comprises tracking changes to the at least one contextual cue in real-time.

7. The method in accordance with claim 5, wherein determining at least one contextual cue comprises determining the at least one contextual cue that includes one of a location, an environmental condition, a duration, a date, a time of day, and a user certification.

8. The method in accordance with claim 5, wherein providing the data comprises transmitting the data to the mobile computing device over a wireless network.

9. The method in accordance with claim 5 further comprising storing the data in the mobile computing device.

10. The method in accordance with claim 9, wherein storing the data comprises associating the data with a temporary lifespan.

11. The method in accordance with claim 5, wherein defining parameters comprises defining a geo-fencing area, wherein the at least one contextual cue aligns with the parameters when the at least one contextual cue is a location within the geo-fencing area.

12. The method in accordance with claim 5, wherein defining parameters comprises defining acceptable environmental conditions for performing the task.

13. A method of managing an operation using a mobile computing device, the method comprising: determining at least one task to perform; determining at least one contextual cue associated with at least one of the at least one task, the mobile computing device, and a user of the mobile computing device; selecting data based on the at least one contextual cue, wherein the data is associated with the at least one task; verifying the at least one contextual cue satisfies parameters for authorizing the data to be provided to the mobile computing device; and providing the data to the mobile computing device; defining the parameters for authorizing the data provided when the at least one contextual cue aligns with the parameters.

14. The method in accordance with claim 13 wherein providing the data comprises: providing a first set of data when the at least one contextual cue aligns with a first parameter of the at least one parameter; and providing a second set of data when the at least one contextual cue aligns with a second parameter of the at least one parameter.

15. The method in accordance with claim 13 wherein determining at least one contextual cue comprises generating an alert when a contextual cue other than the at least one contextual cue aligns with the at least one parameter.

16. The method in accordance with claim 13 further comprising:
selecting equipment for performing the at least one task; and
generating an alert when equipment other than the selected equipment is used to perform the at least one task.

17. The method in accordance with claim 16, wherein selecting equipment comprises selecting at least one of tools and parts for performing the at least one task.

* * * * *